(12) United States Patent
Gupta et al.

(10) Patent No.: US 9,311,388 B2
(45) Date of Patent: *Apr. 12, 2016

(54) SEMANTIC AND CONTEXTUAL SEARCHING OF KNOWLEDGE REPOSITORIES

(75) Inventors: Monika Gupta, New Delhi (IN); Debdoot Mukherjee, West Bengal (IN); Senthil K. Mani, Haryana (IN); Vibha S. Sinha, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 354 days.

This patent is subject to a terminal disclaimer.

(21) Appl. No.: 13/585,089

(22) Filed: Aug. 14, 2012

(65) Prior Publication Data
US 2013/0144872 A1 Jun. 6, 2013

Related U.S. Application Data

(63) Continuation of application No. 13/310,868, filed on Dec. 5, 2011.

(51) Int. Cl.
G06F 7/00 (2006.01)
G06F 17/30 (2006.01)

(52) U.S. Cl.
CPC ................ G06F 17/30675 (2013.01)

(58) Field of Classification Search
USPC ........................................................ 707/749
See application file for complete search history.

(56) References Cited

U.S. PATENT DOCUMENTS

| 7,584,161 | B2 | 9/2009 | Forbes et al. |
| 7,970,786 | B2 | 6/2011 | Bahrami et al. |
| 7,970,791 | B2 | 6/2011 | Liao et al. |
| 8,001,064 | B1 * | 8/2011 | Rennison ............ G06F 17/3066 706/14 |
| 8,001,119 | B2 | 8/2011 | Aggarwal et al. |
| 2005/0278321 | A1 * | 12/2005 | Vailaya et al. ..................... 707/3 |
| 2007/0185868 | A1 * | 8/2007 | Roth et al. ......................... 707/6 |
| 2008/0172364 | A1 | 7/2008 | Cucerzan et al. |
| 2008/0306959 | A1 | 12/2008 | Spivack et al. |

(Continued)

OTHER PUBLICATIONS

Mazzoleni et al. Consultant Assistant: A Tool for Collaborative Requirements Gathering and Business Process Documentation. In Proceedings of the 24th ACM SIGPLAN Conference Companion on Object Oriented Programming Systems Languages and Applications, pp. 807-808, 2009.

(Continued)

Primary Examiner — Alex Gofman
Assistant Examiner — Muluemebet Gurmu
(74) Attorney, Agent, or Firm — Ryan, Mason & Lewis, LLP

(57) ABSTRACT

A method for semantic and contextual searching over a knowledge repository. The method includes creating a search query for each concept related to the target concept to form a search context, wherein the search query for each related concept comprises at least one word derived from a record of that concept previously authored in the project, running the search query on a search index of a knowledge repository to identify a record of the related concept for which the search query is created, and fetching the record of the target concept from the repository as a search result such that the fetched record of the target concept is linked in the knowledge repository to a record of the related concept returned as a result of running the search query on at least one record of the at least one related concept.

16 Claims, 10 Drawing Sheets

(56) References Cited

U.S. PATENT DOCUMENTS

| | | | |
|---|---|---|---|
| 2009/0112841 A1 | 4/2009 | Devarakonda et al. | |
| 2009/0171938 A1 | 7/2009 | Levin et al. | |
| 2009/0222400 A1* | 9/2009 | Kupershmidt et al. | 706/52 |
| 2011/0173220 A1 | 7/2011 | Jung et al. | |

OTHER PUBLICATIONS

Malone et al. Organizing Business Knowledge: The MIT Process Handbook, 2003.

Porter, An Algorithm for Suffix Stripping, Program, 14 No. 3, pp. 130-137, Jul. 1980, http://maya.cs.depaul-edu/~classes/ds575/papers/porter-algorithm.html.

Enterprise Semantic Intelligence Knowledge Suite, http://transinsight.com/products/?lang=en, downloaded Dec. 29, 2011, pp. 1-2.

Mangold et al., Improving Intranet Search-Engines Using Context Information From Database, CIKM'05, Oct. 31-Nov. 5, 2005, pp. 1-2.

Green, Silver Creek Systems, Inc. Enterprise Data Record Level Semantic Model of Enterprise Content, www.silvercreeksystems.com, 2004, pp. 1-13.

Schatz, Digital Libraries of Community Knowledge: The Coming World of the Interspace, Digital Libraries: Research and Practice, 2000 Kyoto, International Conference, 2000, 455-466, Nov. 2000.

Integrating Teams, Tools, Processes, and Knowledge, http://www.zagile.com/products/project-lifecycle-products.html, downloaded Dec. 29, 2011, pp. 1-9.

Ashok et al., Debugadvisor: A Recommender System for Debugging, in Proceedings of the 7th Joint Meeting of the European Software Engineering Conference and the ACM SIGSOFT Symposium on the Foundations of Software Engineering, pp. 373-382, 2009.

Brin et al., The Anatomy of a Large-Scale Hypertextual Web Search Engine, Computer Networks and ISDN Systems, pp. 30(1-7):107-117, 1998.

Budzik et al., WATSON: Anticipating and Contextualizing Information Needs, in Proceedings of the Annual Meeting-American Society for Information Science, vol. 36, pp. 727-740, 1999.

Cohen et al., XSearch: A Semantic Search Engine for XML, in Proceedings of the 29th International Conference on Very Large Databases, vol. 29, pp. 45-56, 2003.

Fagin et al., Understanding Queries in a Search Database System, in Proceedings of the Twenty-ninth ACM SIGMOD-SIGACT-SIGART Symposium on Principles of Database Systems of Data, pp. 273-284, 2010.

Finkelstein et al., Placing Search in Context: The Concept Revisited, in Proceedings of the 10th International Conference on World Wide Web, pp. 406-414, 2001.

Guo et al., XRANK: Ranked Keyword Search Over XML Documents, in ACM SIGMOD International Conference on Management of Data, pp. 16-27, 2003.

Hawking et al., Challenges in Enterprise Search, in Proceedings of the 15th Australasian Database Conference, vol. 27, pp. 15-24, 2004.

Kleinberg et al., Authoritative Sources in a Hyperlinked Environment, Journal of the ACM (JACM), pp. 46 (5):604-632, 1999.

Kraft et al., Searching with Context, in Proceedings of the 15th International Conference on World Wide Web, pp. 477-486, 2006.

Manning et al., Introduction to Information Retrieval, vol. 1, pp. 1-8, 2008.

Mukherjee et al., AHA: Asset Harvester Assistant, IEEE International Conference on Services Computing, pp. 425-432, 2010.

Schumm et al., Fragmento: Advanced Process Fragment Library, Institute of Architecture of Application Systems, in Proceedings of the 19th International Conference on Information Systems Development, 2010, pp. 1-13.

Song et al., RepoX: An XML Repository for Workflow Designs and Specifications, University of Georgia, 2001, pp. 1-43.

Wasser et al., ProcessGene Query—A Tool for Querying the Content Layer of Business Process Models, in Demo Session of the 4th International Conference on Business Process Management, pp. 1-8, downloaded Dec. 29, 2011.

Yan et al., Business Process Model Repositories—Framework and Survey, Information Sciences, 2009, pp. 1-26.

Ye et al., Supporting Reuse by Delivering Task-Relevant and Personalized Information, in Proceedings of the 24th International Conference on Software Engineering, pp. 513-523, 2002.

Gupta et al., Serving Information Needs in Business Process Consulting, BPM 2011, pp. 1-27.

* cited by examiner

FIG. 1

*PROCESS NAME, SUPPLIER, INPUT/OUTPUT, KPI, PROCESS STEPS, BUSINESS BENEFITS, INTEGRATION CONSIDERATIONS, ORGANIZATIONAL CHANGE IMPACT*

102 — PDD1 ¹PROCESSING EXTERNAL MANUFACTURING PURCHASE ORDERS

| STEP | TRANSACTION | APPLICATION | TRANSACTION DESCRIPTION |
|---|---|---|---|
| Create Purchase Requisitions – External Mfg. | ME51N | [ECC] | Create Purchase Requisition |
| Purchase Requisition Release (Approval) | ME54N | [ECC] | Release Purchase Requisition |

104 — PDD2 ²PROCESSING DIRECT PURCHASE ORDERS

| STEP | TRANSACTION | APPLICATION | TRANSACTION DESCRIPTION |
|---|---|---|---|
| Create Purchase Requisitions – Direct (automatic and manual) | ME51N | [ECC] | Create Purchase Requisition |
| Purchase Requisition Release (Approval) | ME54N | [ECC] | Release Purchase Requisition |

106 — PDD3 ³PROCESSING INDIRECT PURCHASE ORDERS

| STEP | TRANSACTION | APPLICATION |
|---|---|---|
| Create Shopping Cart – Shopping cart creation | | [SRM] |
| Create Shopping Cart – Select product/item | | [SRM] |

108 —

| SEARCH TECHNIQUE | KEYWORDS/QUERIES | SEARCH RESULTS |
|---|---|---|
| KEYWORD SEARCH | "PURCHASE ORDERS" | PDD1, PDD2, PDD3 |
| KEYWORD SEARCH | "PURCHASE ORDERS, CREATE PURCHASE" | PDD1, PDD2, PDD3 |
| SEMANTIC SEARCH | "PURCHASE ORDERS" IN PROCESS-NAME AND "CREATE PURCHASE" IN PROCESS-STEPS | PDD1, PDD2 |

FIG. 1 cont.

*PROCESS NAME*, SUPPLIER, INPUT/OUTPUT, KPI, *PROCESS STEPS*, BUSINESS BENEFITS, INTEGRATION CONSIDERATIONS, *ORGANIZATIONAL CHANGE IMPACT*

3.1 ORGANIZATIONAL CHANGE IMPACTS

| PROJECT ID | TITLE | DEGREE OF IMPACT | TYPE | PROGRAM ACCOUNTABILITY |
|---|---|---|---|---|
| PTP_GT_PDD26 | Legacy system replacement | Global-Medium | Data and Technology | YES |
| PTP_GT_PDD26 | Change in accountability for planning results | Global-Medium | Roles and Responsibilities | YES |

3.1 ORGANIZATIONAL CHANGE IMPACTS

| PROJECT ID | TITLE | DEGREE OF IMPACT | TYPE |
|---|---|---|---|
| PTP_GT_PDD26 | Legacy system replacement | Global-Medium | Data and Technology |
| PTP_GT_PDD26 | Change in accountability for planning results | Global-Medium | Roles and Responsibilities |

3.1 ORGANIZATIONAL CHANGE IMPACTS

| PROJECT ID | TITLE | DEGREE OF IMPACT | TYPE |
|---|---|---|---|
|  | Separation of Transactional Purchasing from Strategic Sourcing | Global-Medium | Roles and Responsibilities |
|  | One Global Integrated System | Global-Medium | Data and Technology |

FIG. 2
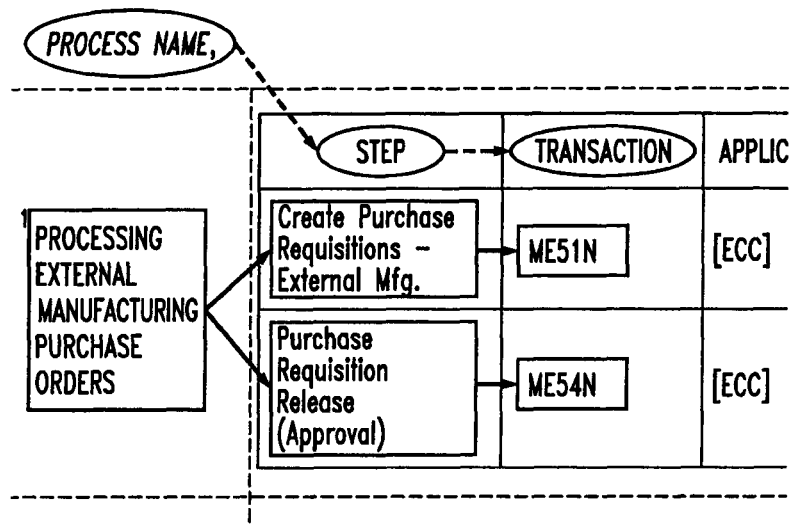
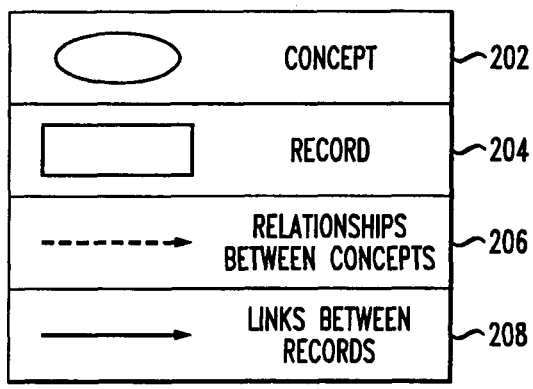

FIG. 5 cont.

SEARCH PROCEDURE

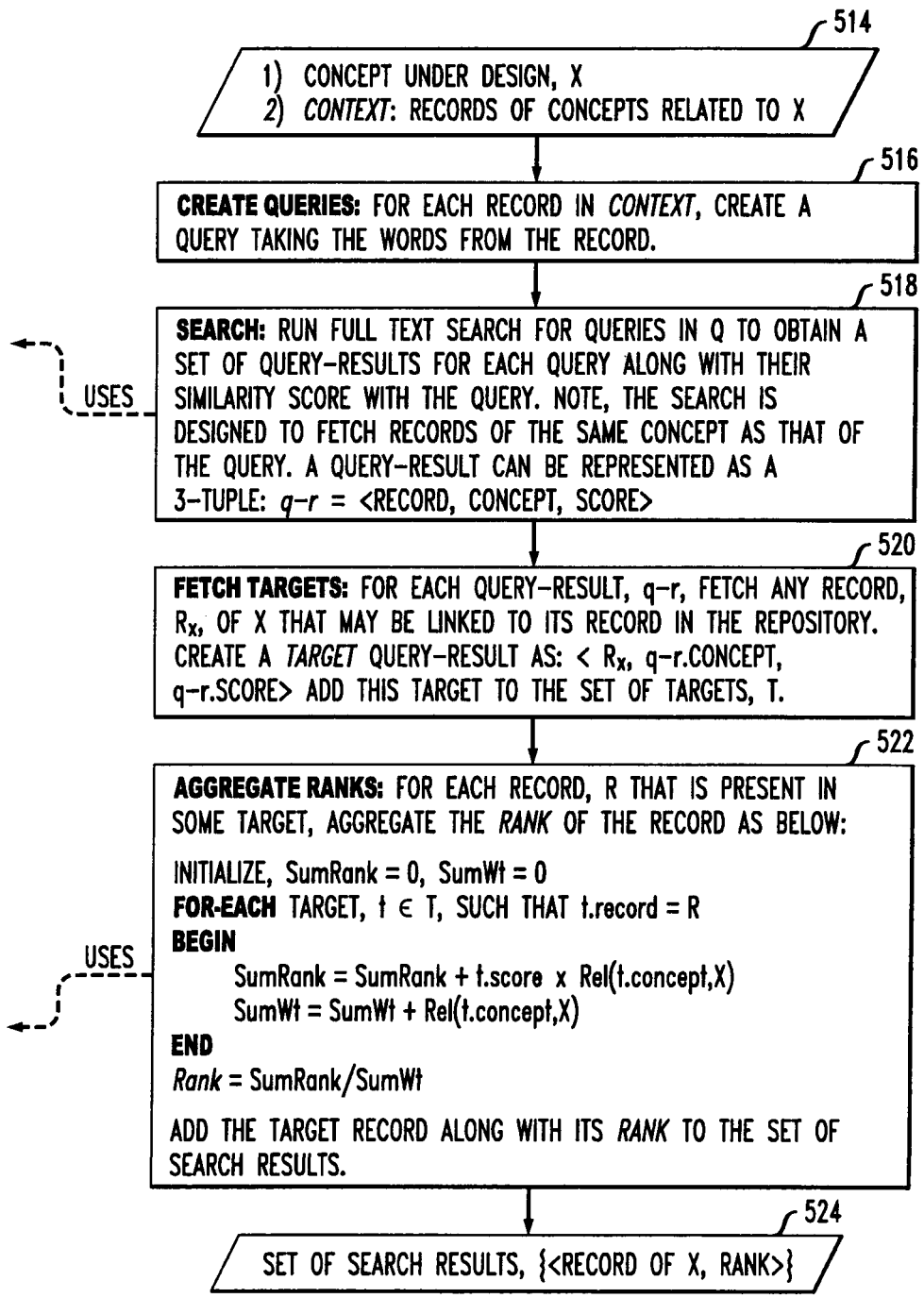

514 — 1) CONCEPT UNDER DESIGN, X
2) *CONTEXT*: RECORDS OF CONCEPTS RELATED TO X

516 — CREATE QUERIES: FOR EACH RECORD IN *CONTEXT*, CREATE A QUERY TAKING THE WORDS FROM THE RECORD.

518 — SEARCH: RUN FULL TEXT SEARCH FOR QUERIES IN Q TO OBTAIN A SET OF QUERY-RESULTS FOR EACH QUERY ALONG WITH THEIR SIMILARITY SCORE WITH THE QUERY. NOTE, THE SEARCH IS DESIGNED TO FETCH RECORDS OF THE SAME CONCEPT AS THAT OF THE QUERY. A QUERY-RESULT CAN BE REPRESENTED AS A 3-TUPLE: $q-r$ = <RECORD, CONCEPT, SCORE>

(USES)

520 — FETCH TARGETS: FOR EACH QUERY-RESULT, q-r, FETCH ANY RECORD, $R_x$, OF X THAT MAY BE LINKED TO ITS RECORD IN THE REPOSITORY. CREATE A *TARGET* QUERY-RESULT AS: < $R_x$, q-r.CONCEPT, q-r.SCORE> ADD THIS TARGET TO THE SET OF TARGETS, T.

522 — AGGREGATE RANKS: FOR EACH RECORD, R THAT IS PRESENT IN SOME TARGET, AGGREGATE THE *RANK* OF THE RECORD AS BELOW:

INITIALIZE, SumRank = 0, SumWt = 0
FOR-EACH TARGET, t ∈ T, SUCH THAT t.record = R
BEGIN
    SumRank = SumRank + t.score × Rel(t.concept,X)
    SumWt = SumWt + Rel(t.concept,X)
END
*Rank* = SumRank/SumWt

ADD THE TARGET RECORD ALONG WITH ITS *RANK* TO THE SET OF SEARCH RESULTS.

(USES)

524 — SET OF SEARCH RESULTS, {<RECORD OF X, RANK>}

```
algorithm SearchProcess
input   1. Concept under design, $C_i$
        2. Context,
           $\beta_{C_i} = \{r : (r.C, C_i) \in R, r.C \leq C_i\}$
        3. (Optional) User keywords, $q_u$
output  Ranked set of 2-tuples $(r, \alpha)$ of
        record$(r)$ and relevance-score$(\alpha)$, $\psi$ begin
1.  $Q$ = formulateQuerySet($\beta_{C_i}$, $q_u$, $C_i$)
2.  // $Q = \{(\tau, C) : \tau$ is a term-vector, $C \in E\}$
3.  Initialize target-set, $T = \phi$
4.  foreach query $q_i \in Q$ do
5.     $S_i$ = search($q_i$)
6.     foreach $s \in S_i$ do
7.        if $s.\alpha > \kappa$ then
8.           $T_s$ = fetchTargetSet($s.r$, $C_i$)
9.           $T = T \cup T_s$
10. Initialize, $\psi = \phi$
11. foreach record $r_i : r_i = t.r, t \in T$ do
12.    $\alpha_i$ = aggregateRank($r_i$, $T$, $C_i$)
13.    Add $(r_i, \alpha_i)$ to $\psi$
14. $\psi$ = Sort $\psi$ in descending order of $\alpha_i$
end function search(Query $q$)

begin
15. $S = \{(r_i, \alpha)\}$ s.t. $r_i$ is a record of $q.C$
    returned by a FTS on $q.\tau$ with a
    normalized score, $\alpha > \kappa$
16. return $S$
end function formulateQuerySet(Records, $\beta_{C_i}$, Terms $q_u$, Concept $C_i$)
```

```
begin
  17. Initialize, Q = φ
  18. foreach record r_i ∈ β_{C_i} do
  19.    Create a new query, q_i; q_i.C = r_i.C
  20.    q_i.T = Terms extracted from r_i.δ
  21.    Add q_i to Q
  22.    Add (q_u, C_i) to Q
  23. return Q
end function fetchTargetSet(SearchResult s, Concept C_i)

begin
     //A target is a 3-tuple (r, α, C) containing
     //record, score and query concept
  24. T = {(r_i, s.α, r.C) : s.r → r_i}
  25. return T
end function aggregateRank(Record s, Targets T, Concept C_i)

begin
  26. Initialize, SumRank = 0, SumWt = 0
  27. foreach target t ∈ T such that t.r = r_i
  28.      SumRank = SumRank + t.α × Rel(t.C, C_i)
  29.      SumWt = SumWt + Rel(t.C, C_i)
  30. return SumRank/SumWt
end
```

*FIG. 6 cont.*

SEMANTIC AND CONTEXTUAL SEARCHING OF KNOWLEDGE REPOSITORIES

CROSS-REFERENCE TO RELATED APPLICATIONS

This application is a continuation of U.S. patent application Ser. No. 13/310,868, filed Dec. 5, 2011, incorporated by reference herein.

FIELD OF THE INVENTION

Embodiments of the invention generally relate to information technology, and, more particularly, to knowledge repository searching.

BACKGROUND OF THE INVENTION

Services enterprises create knowledge during any undertaken engagement. Success can often be governed by the quality of knowledge created during the engagement. Also, success and failure are directly tied to the relevant experience of the participating knowledge workers.

Information (or knowledge) is captured in the different documents that are produced in an engagement (contracts, requirement specifications, design artifacts, code, etc.). Enterprises archive these documents as assets so that the assets can be leveraged in future projects. Encapsulation and reuse of such knowledge can translate individual knowledge into an organizational capability. However, effective reuse of information can depend on the structure of the information in the repositories as well as information search and retrieval ease and accuracy.

During requirements gathering, most information is authored as unstructured documents such as word documents, spreadsheets, etc. Consulting practices often use document templates with a rudimentary structure; however, these are still treated as unstructured text in the asset repository.

Existing approaches also include domain-specific workbenches that aim to help to standardize content authoring, retain semantics, traceability between different artifacts, and store material as semi-structured data in repositories with meta-data. Also, existing approaches include free-text search using keywords for unstructured documents. However, such search results can be highly imprecise and can return a large amount of irrelevant information.

Additionally, existing enterprise search techniques are not nearly as effective as web searching techniques. For example, link analysis techniques that are instrumental in retrieving high quality web pages do not apply in the case of enterprise searching because of an absence of hyperlinked structure.

Accordingly, there exists a need for effective search techniques over enterprise repositories.

SUMMARY OF THE INVENTION

In one aspect of the present invention, techniques for semantic and contextual searching of knowledge repositories are provided. An exemplary computer-implemented method for semantic and contextual searching over a knowledge repository to provide a record for a target concept based on a search context set by records of at least one related concept previously authored in a project can include steps of creating a search query for each of at least one concept related to the target concept to form a search context, wherein the search query for each of the at least one related concept comprises at least one word derived from at least one record of that concept previously authored in the project, running the search query on a search index of a knowledge repository to identify at least one record of the at least one related concept for which the search query is created, and fetching the at least one record of the target concept from the repository as a search result such that the at least one fetched record of the target concept is linked in the knowledge repository to a record of the at least one related concept returned as a result of running the search query on at least one record of the at least one related concept.

Another aspect of the invention or elements thereof can be implemented in the form of an article of manufacture tangibly embodying computer readable instructions which, when implemented, cause a computer to carry out a plurality of method steps, as described herein. Furthermore, another aspect of the invention or elements thereof can be implemented in the form of an apparatus including a memory and at least one processor that is coupled to the memory and operative to perform noted method steps. Yet further, another aspect of the invention or elements thereof can be implemented in the form of means for carrying out the method steps described herein, or elements thereof; the means can include (i) hardware module(s), (ii) software module(s), or (iii) a combination of hardware and software modules; any of (i)-(iii) implement the specific techniques set forth herein, and the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

BRIEF DESCRIPTION OF THE DRAWINGS

FIG. 1 is a diagram illustrating example semantic search fetches and relevant results, according to an embodiment of the present invention;

FIG. 2 is a diagram illustrating example representations of identified terminology, according to an embodiment of the invention;

FIG. 6 is a diagram illustrating the search algorithm, according to an embodiment of the invention;

DETAILED DESCRIPTION OF EMBODIMENTS

Figure 3:
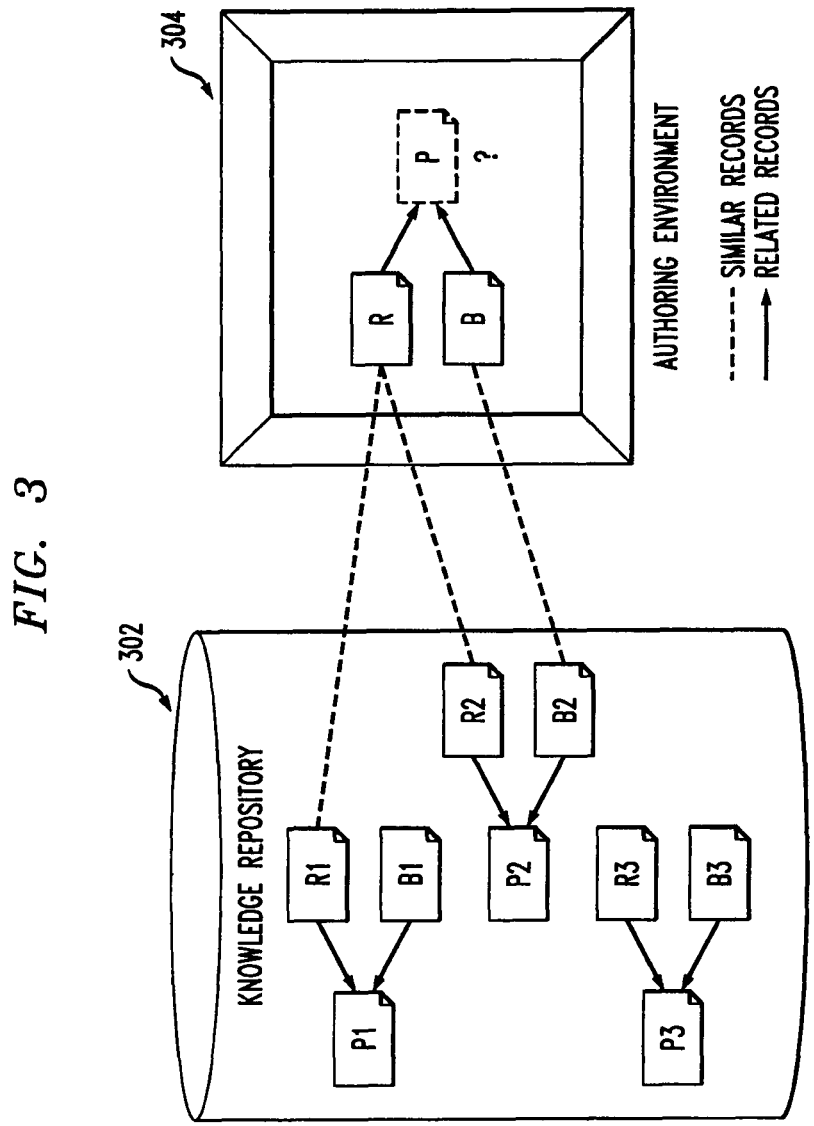
FIG. 3 is a diagram illustrating an example of the search procedure, according to an embodiment of the invention.

As described herein, an aspect of the present invention includes semantic and contextual searching over knowledge repositories of service enterprises. Services enterprises create "knowledge" during any engagement undertaken. By way of example, success of an engagement/project can be governed by quality of knowledge created during the engagement, and success or failure can often be directly tied to the relevant experience of the participating knowledge workers.

As used herein, "knowledge" can refer to information that is captured in the different documents that are produced (for example, contracts, requirement specifications, design artifacts, code, etc.). Enterprises archive these documents as assets so that they can be leveraged in future projects. Efficient encapsulation and reuse of such knowledge can translate individual knowledge into an organizational capability. Additionally, use of such knowledge can serve as a safeguard against employee churn, help bring novice consultants up to speed, improve productivity of consultants and quality of solutions, etc. As detailed herein, efficient and effective reuse of such information depends on the structure of the information in the repositories as well as information search and retrieval ease and accuracy.

An aspect of the invention includes techniques for organizing and reusing knowledge assets, specifically artifacts related to enterprise processes, produced during requirements gathering in an enterprise-transformation project. The knowledge assets are stored in a semi-structured format. Also, it is noted that much of the content contained in process-related work products can be represented within a domain specific information model. Therefore, at least one embodiment of the invention includes storing these work products in a semi-structured format (for example, extensible markup language (XML)) that follows a domain-specific schema.

Semi-structured data, for example, makes evident different concepts such as process steps and enterprise benefits present in a process document. Thus, identifying keywords in the description of a specific concept would make searching more efficient and accurate, especially in cases where the process documents are heterogeneous in terms of concepts.

As also described herein, an aspect of the invention includes a search strategy that uses the context of a task at hand to retrieve relevant information from a repository. In searching and reusing knowledge assets, keywords are identified in the description of a specific concept and translated into the "context" for a query. As opposed to merely gathering a set of keywords as context, an aspect of the invention translates the context to fat semantic queries which leverage the semi-structured nature of the content.

In identifying context, note that information creation tasks in consulting/services engagements do not happen independently of one another. Information created during any task can depend upon information present in one or more artifacts which are already created in the project. For example, in a typical application development engagement, first requirements are drawn, then enterprise processes are charted and finally source-code is developed. The source-code depends heavily upon the requirement documents and the process definitions. Further, in a highly collaborative environment, knowledge workers are often unaware of the complete context behind the information authoring task assigned to them.

FIG. 1 is a diagram illustrating example semantic search fetches and relevant results, according to an embodiment of the present invention. By way of illustration, one of the central documents created in an enterprise-transformation project is the process-definition document (PDD). A PDD contains a detailed description of an enterprise process and, in particular, contains information about different concepts. Such concepts can include, for example, the following: (1) Process: the name and a brief description of the process; (2) Process steps: one or more steps that constitute the process; (3) Inputs: one or more inputs to the process steps; (4) Outputs: one or more outputs from the process steps; (5) Enterprise benefits: one or more benefits to the enterprise; (6) Organizational change impact (OCI): impact of the process on the organization; (7) Requirements: one or more functional or nonfunctional requirements; (8) Regulations: rules and regulations that the process must conform to; (9) Integration considerations: various technical or functional integration points applicable; (10) Key design decisions: design considerations for the process; (11) Triggers: the trigger points for the process; and (12) Dependencies: the dependencies for the process. At the conclusion of a project, these documents are cleansed to remove client-specific information and populated into a knowledge repository to be leveraged in future projects.

To illustrate searching for information from such a repository, consider the example shown in FIG. 1, which depicts three PDDs (in the rows) and three concepts (in the columns—process name, process steps, and OCI, respectively). All of the processes contain the term Purchase Orders in their names; the process steps of PDD1 102 and PDD2 104 are very similar, whereas the steps of PDD3 106 are quite different. FIG. 1 also depicts table 108, which contrasts the search results derived from a simple keyword-based search vis-à-vis a semantic search when they are performed with sample keywords and queries (second column in table 108) on the three documents—PDD1, PDD2, and PDD3.

Consider the scenario where a consultant is creating the steps for a Purchase Order process, and has to understand and document the change impact of the process. To leverage the information captured in the knowledge repository, the consultant searches the repository for similar PDDs to examine the OCI information in those documents. If the search is performed using the keyword Purchase Orders, all three PDDs (that is, 102, 104 and 106) would be retrieved. Suppose that the consultant mentions Create Purchase as another keyword. The search would still return all three documents. Essentially, the search lacks the capability to associate keywords with concepts and, thereby, search for a keyword over a restricted space (that is, a concept) instead of over the entire PDD.

Accordingly, an aspect of the present invention includes extracting concepts from PDDs and performing a search over concepts. For the example scenario depicted in FIG. 1, an embodiment of the invention could include constructing two queries, to search for: (1) Purchase Orders over the process (name) concept, and (2) Create Purchase over the process-step concept. When these queries are executed, only PDD1 102 and PDD2 104 are retrieved, which are the PDDs that the consultant would want to examine. In this manner, the accuracy of the enterprise search is improved.

FIG. 2 is a diagram illustrating example representations of identified terminology, according to an embodiment of the invention. By way of illustration, FIG. 2 depicts a concept 202, a record 204, relationships 206 between concepts, and links 208 between records. Further, as used herein, an information schema is a map of concepts and their inter-relationships. For example, Requirement, Enterprise-Process, Steps can be concepts in a schema, while (Enterprise-Process→Step) can be a relationship. An aspect of the invention assumes the existence of a domain information schema and a repository that organizes content per such a schema.

As also used herein, a record is an instance of a concept, containing the data for the concept. It is assumed that a knowledge repository can be a collection of records of concepts defined in the domain information schema. Data of a record can be in the form of plain text, rich text or binary (for images and attachments). Additionally, two records produced in the same project are said to be linked (or related), R1→R2, if their respective concepts are related in the schema, that is, $C1 \rightarrow C2$. For example, in FIG. 2, the Enterprise-Process record "Processing External Manufacturing Process Order" is linked to the Step record "Create Purchase Requisitions—External Mfg."

Additionally, as used herein, with the notion of similarity in records, two records of the same concept are considered to be similar (R1~R2), if there is a high degree of textual similarity. Different text similarity measures may be used, such as, for example, cosine similarity. Empirically, an embodiment of the invention can consider R1~R2 if Cosine-Similarity (R1, R2)>k (where k is some threshold, say 0.5).

As detailed herein, a consulting or service engagement can be thought of as a series of information creation tasks, where each task produces a record for a particular concept. Accordingly, during creation of a record for concept X, an aspect of the invention provides techniques for delivering relevant records from a knowledge repository which stores records from past projects.

Similarity in two records of a concept can influence similarity in the corresponding records of a dependent concept. For example, if a set of highly similar records for requirements is found, then the corresponding records for processes should be similar as well. Symbolically, $R_a \sim R_b$ will lead to $R_x \sim R_y$, if $R_a \rightarrow R_x$ and $R_b \rightarrow R_y$. However, different concepts may dictate the contents of a dependent concept to different degrees. For example, the desired enterprise benefit may be a stronger driver for the choice of a process than the requirements.

For effective utilization of the available context for searching, one preferably has an idea of how strongly similarity in records of a concept determines similarity in records of another dependent concept. To quantify the same, an aspect of the invention includes computing the following probability, Rel, for ordered pairs of concepts $(C_i, C_j)$ as the probability that two records of $C_j$ are similar given that their linked records of a related concept $C_i$ are known to be similar. Symbolically, $\text{Rel}(C_i, C_j) = P(R_x \sim R_y | R_a \sim R_b, R_a \rightarrow R_x, R_b \rightarrow R_y)$ where, $R_a \in C_i, R_b \in C_i, R_x \in C_j$ and $R_y \in C_j$.

In an aspect of the invention, knowledge organization can include the following. All records are indexed as documents in a Full Text Search engine, and the name of the concept is tracked as a field in the document, so that semantic searching is possible. Also, scores of pair-wise dependence (denoted as Rel) between all concepts in the schema are computed by measuring how similarity in different records of a concept is correlated to the same for another concept. These scores are used to rank search results.

Accordingly, in an aspect of the invention, the search procedure includes tracing a search context, running search queries, and ranking search results. In tracing a search context, for each concept on which X (the new project) depends, a search query is created by taking the words from their records (if they are already created). This set of queries forms the search context. For example, creation of steps depends upon the recorded requirements and enterprise-benefits. Accordingly, to search for steps, queries are created from the records of requirements and enterprise-benefits.

Also, each search query (created as above) is run on indices (for example, using a conventional Full Text Search) to return records of the concept which was used to create the query. Additionally, the records of X that are linked to the query-results in the repository are fetched, and these records form the search results for X. For example, the search queries are run to get similar records of requirements and enterprise-benefits. The step records linked to these records of requirements and enterprise-benefits are the search results.

Further, in ranking search results, a Full Text Search returns a relevance rank for all query-results (records of related concepts of X) returned by it. An embodiment of the invention includes obtaining a rank for the records of X by weighting the relevance rank for the query-result by the Rel score between X and the related concept from which the query was created. As used herein, the Rel score is the degree to which related concepts influence X. For example, weigh the records of steps linked to query-results of enterprise-benefits and requirements by Rel(Enterprise-Benefit, Step) and Rel(Requirement, Step), respectively.

FIG. 3 is a diagram illustrating an example of the search procedure, according to an embodiment of the invention. By way of illustration, FIG. 3 depicts a knowledge repository 302 and an authoring environment 304. Further, author steps (P) given records for requirements (R) and enterprise-benefits (B). Accordingly, an embodiment of the invention would include looking for similar requirements and enterprise benefits in the repository. In the FIG. 3 example, this would include R1~R, R2~R, B2~B. Also, the techniques would include finding steps (P1 and P2) linked to R1, R2, and B2. The relevance rank of P2 may be calculated as a weighted average of Sim(B, B2) and Sim(R, R2), the weights being Rel(Enterprise-Benefit, Step) and Rel(Requirement, Step). As noted above, the text similarity (Sim) between records can be measured in different standard ways (for example, cosine similarity or edit distances).

Figure 4:
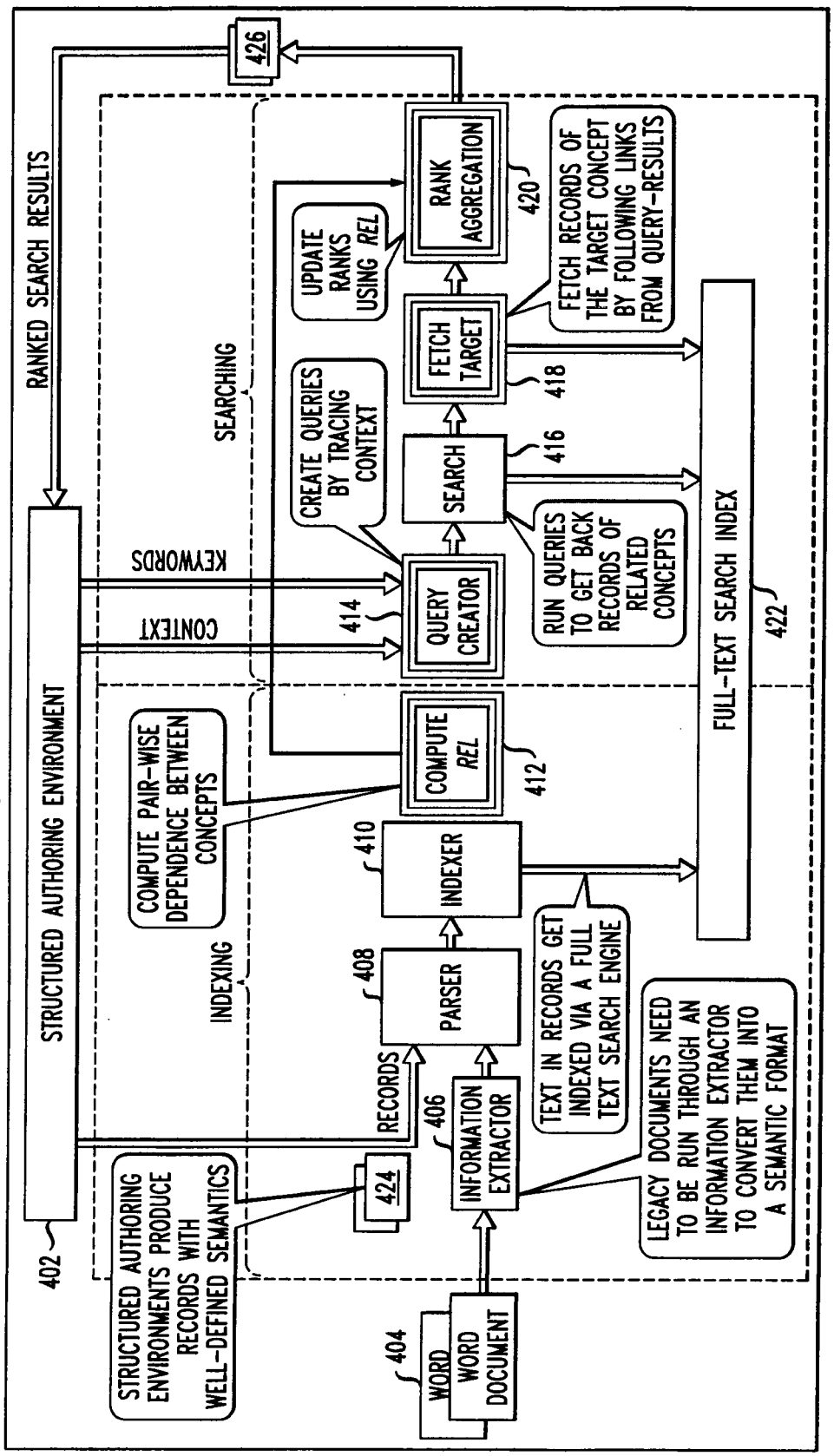
FIG. 4 is a block diagram illustrating an example embodiment, according to an aspect of the invention.

FIG. 4 is a block diagram illustrating an example embodiment, according to an aspect of the invention. By way of illustration, FIG. 4 depicts the architecture of the search system of an aspect of the invention. Functionally, the system is decomposed into two parts, an indexing component and a search component. In at least one embodiment of the invention, the components can be built on top of a conventional Full-Text Search (FTS) engine (for example, Apache Lucene), deployed in a knowledge repository.

With respect to the indexing procedure, as described herein, a typical work-product in process consulting engagements captures information on multiple concepts.

Instead of adding full work-products as documents in a Full-Text Search engine, an embodiment of the invention builds an index with records 424. For example, a PDD work-product can be split into lists of records of requirements, process steps, enterprise benefits, etc., and each individual record can be indexed as a document. The content produced in a structured authoring environment 402 is already in the form of records 424, hence it is readily indexable.

If there is a need to bootstrap the repository with a corpus of legacy documents 404 produced in formats such as MS-Word, an aspect of the invention can employ an information extractor module 406 to shred documents into records and then load the same. Legacy documents 404 are run through the information extractor module 406 to convert them into a semantic format. Each document, prepared from a record, $r_i$, lists as fields the name of the concept $C_i$, and links to other documents of records, $r_j$, such that $r_i \rightarrow r_j$. Documents are parsed using format specific parsers such as parser module 408, their content is stemmed, and an FTS index 422 is built via indexer module 410. Text in records is indexed via a Full Text Search engine. Also, as part of the overall indexing procedure, an aspect of the invention includes computing and storing values of Rel via Rel computation module 412 for each pair of related concepts in the schema. For example, pair-wise dependence between concepts can be computed.

With respect to the search procedure, the process of searching for relevant records for a concept, $C_i$, by leveraging (and/or tracing) the context described in records of related concepts operates as follows. The set of terms in every record of every related concept of $C_i$ are extracted to constitute a search query via query creator module 414. Such a query runs over the FTS index 422 via search module 416 and returns similar records of the same concept from which the query was created. Also, records of the target concept $C_i$ that are linked to the search results are resolved and fetched via the target fetching module 418. Further, these records of $C_i$ are suitably ranked via rank aggregation module 420 and returned as final search results 426.

The ranking presents a relevance score of the search result based on the current context as set in the project. An embodiment of the invention (discussed below) computes the relevance score as a function of:

a) the degree to which the records of the related concepts of $C_i$ linked to the search result are textually similar to the records of those concepts already authored in the project; and b) the degree to which the related concepts of $C_i$, the records of which were used to frame the search query, can influence the creation of a record of $C_i$.

Figure 5:
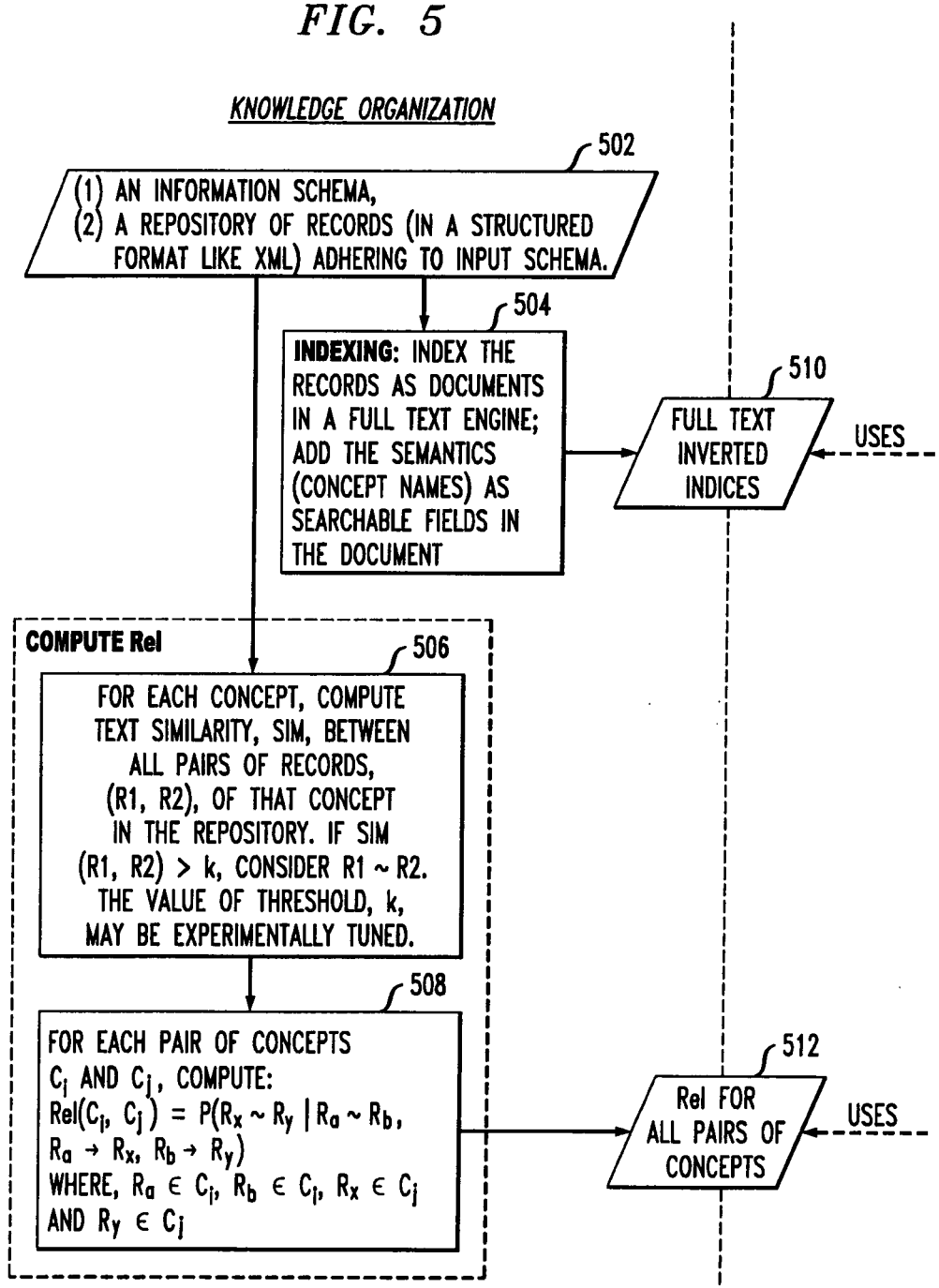
FIG. 5 is a flow diagram illustrating techniques for semantic and contextual searching over knowledge repositories, according to an embodiment of the invention.

FIG. 5 is a flow diagram illustrating techniques for semantic and contextual searching over knowledge repositories, according to an embodiment of the invention. As depicted in FIG. 5, two portions of the techniques are identified: knowledge organization and search procedure. With respect to knowledge organization, step 502 includes accessing an information schema and a repository of records (in a structured format such as XML) adhering to input schema. Step 504 includes indexing the records as documents in a full text engine and adding the semantics (concept names) as searchable fields in the document. The indexed records are provided to full text inverted indices in step 510.

Step 506 includes computing text similarity, Sim, for each concept between all pairs of records, (R1, R2), of that concept in the repository. If Sim(R1, R2)>k, consider R1~R2. The value of threshold, k, may be experimentally tuned. Step 508 includes computing, for each pair of concepts Ci and Cj, $Rel(Ci, Cj)=P(R_x \sim R_y | R_a \sim R_b, R_a \rightarrow R_x, R_b \rightarrow R_y)$ where, $R_a \in C_i$, $R_b \in C_j$, $R_x \in C_j$ and $R_y | C_j$. A Rel score for all pairs of concepts is provided in step 512.

With respect to the search procedure, step 514 includes obtaining a concept under design, X, as well as context, that is, records of concepts related to X. Step 516 includes creating a query for each record in the context, taking the words from the record. Step 518 includes running a Full Text Search for queries in Q to obtain a set of query-results for each query along with their similarity score with the query. The search is designed to fetch records of the same concept as that of the query. A query-result can be represented as a 3-tuple: q-r=<record, concept, score>. Also, step 520 includes fetching, for each query-result, q-r, any record, RX, of X that may be linked to its record in the repository, as well as creating a target query-result as <RX, q-r.concept, q-r.score>, which is added to the set of targets, T.

Step 522 includes aggregating, for each record, R, which is present in some target, the rank of the record as follows:

---

Initialize, SumRank = 0, SumWt = 0
for each target, t ∈ T, such that t.record = R
begin
   SumRank = SumRank + t.score × Rel(t.concept, X)
   SumWt = SumWt + Rel(t.concept, X)
end
Rank = SumRank/SumWt

---

The target record along with its rank is added to the set of search results. Further, step 524 includes outputting a set of search results {<Record of X, Rank>}.

FIG. 6 is a diagram illustrating the search algorithm 602, according to an embodiment of the invention. For a query designed to fetch records of concept, $C_i$, SearchProcess considers the set of available records of related concepts as the search context, $\beta C_i$, and accepts a set of user-defined keywords, $q_u$, as optional input.

formulateQuerySet (lines 17-23) creates a set of queries, Q, from $\beta C_i$. A query is represented as a 2-tuple (r, C), where r is a set of terms and C is the concept whose records shall be searched. In a query q, derived from $r_i \in \beta C_i$, q.r contains the terms in $r_i.\delta$ and q.C is $r_i.C$. For the keywords, $q_u$, specified by the user, a query is created (line 22) with the terms in $q_u$ and q.C is taken to be $C_i$. Next, each query, q∈Q is fired on the Full Text Search (FTS) index (line 5) created for all records in the repository. $S_i$ denotes the set of top search results for q; it lists records of concept, q.C along-with their relevance-scores, α, such that α is greater than a threshold, κ (line 15).

Also, an aspect of the invention includes the notion of a target. A target, t, contains a record, $r_i$ of $C_i$, which is linked to a record, r reported in a search-result s∈Si, that is, r→$r_i$. Also, t stores the relevance-score, α of the search-result, s and the concept r.C (line 24). Further, in an embodiment of the rank aggregation aspect of the invention, aggregateRank (lines 26-30) re-computes rank for the target records collected across all search results of all queries, q∈Q. The relevance score of a record present in a set of targets, {$t_i$, gets re-adjusted as the weighted mean of the original relevance scores, $t_i.\alpha$, the weights being values of $Rel(t_i.C, C_i)$. The set of target records are sorted in descending order of their scores to return the final results.

Figure 7:
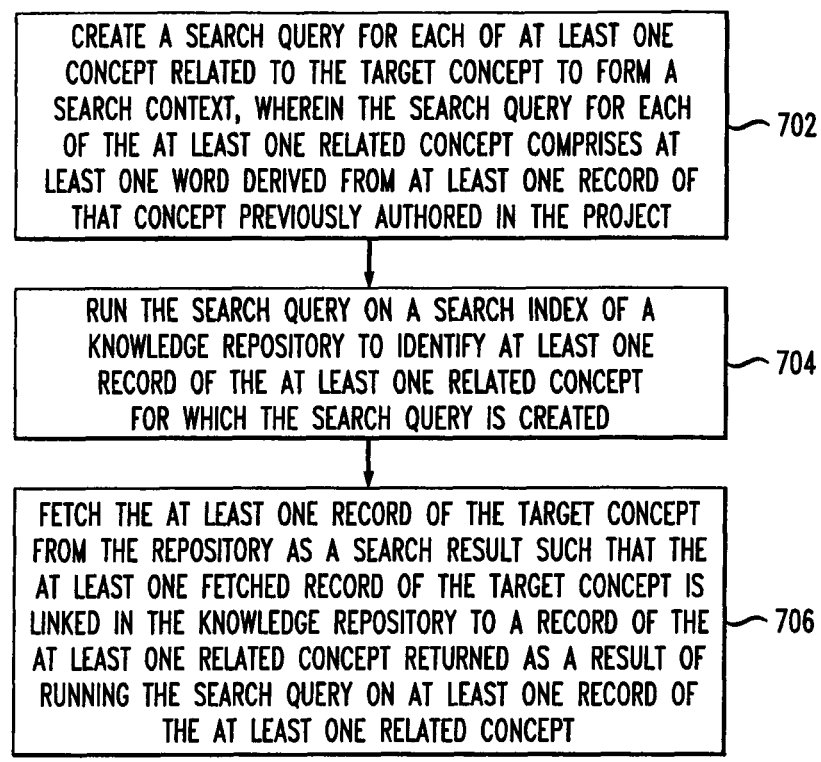
FIG. 7 is a flow diagram illustrating techniques for semantic and contextual searching over a knowledge repository to provide a record for a target concept based on a search context set by records of at least one related concept previously authored in a project, according to an embodiment of the invention.

FIG. 7 is a flow diagram illustrating techniques for semantic and contextual searching over a knowledge repository to provide a (relevant) record for a (desired) target concept based on a search context set by records of at least one related concept previously authored in a project, according to an embodiment of the present invention. Step 702 includes creating a search query for each of at least one concept related to the target concept to form a search context, wherein the search query for each of the at least one related concept comprises at least one word derived from at least one record of that concept previously authored in the project. This step can be carried out, for example, using a query creator module. Creating a search query for each of at least one concept on which a project depends to form a search context includes creating a set of at least one query from text of every record created in the project that impacts a current activity of the project.

Step 704 includes running the search query on a search index of a knowledge repository (for example, via a text search engine) to identify at least one record of the at least one related concept for which the search query is created. This step can be carried out, for example, using a search module. The knowledge repository includes records from at least one past project, and the records from the past project(s) are defined in an information schema. A relationship between two or more concepts in the records is also defined in the information schema.

In an aspect of the invention, running the search query on a search index of a knowledge repository to identify at least one record related to the at least one concept on which the project depends from the repository can include analyzing information created in the project leading up to a current activity and utilizing the information to identify content from the repository.

Step 706 includes fetching the at least one record of the target concept from the repository as a search result such that the at least one fetched record of the target concept is linked in the knowledge repository to a record of the at least one related concept returned as a result of running the search query on at least one record of the at least one related concept. This step can be carried out, for example, using a target fetching module. Fetching the at least one record from the repository as a search result for the project can include fetching a record of a target concept that is linked to the at least one identified record for a related concept in the repository which is similar to the record of the related concept previously authored in the project. Additionally, fetching the at least one record from the repository as a search result for the project can include transitively following links starting from identified records of the related concept in the repository, which are similar to the at least one record of the related concept previously authored in the project, to fetch at least one record of a target concept.

The techniques depicted in FIG. 7 also include generating a rank for the at least one fetched record of the target concept by weighting a relevance rank returned from the search on the search index for the at least one record of the related concept by a Rel score between the target concept and the at least one related concept, wherein a Rel score is a degree to which the record of related concept previously authored in the project can influence creation of a record for the target concept in the project. The rank makes use of a pre-computed score of dependence Rel, between concepts in an information schema in the knowledge repository. Additionally, generating a rank for the at least one fetched record includes computing a rank for each fetched record as a function of a score that indicates textual relevance of each record in the search query that led to the search result. Further, generating a rank for the at least one fetched record can include computing a rank for each fetched record as a function of a score that gives a degree of dependence of a target concept upon the each of at least one concept on which a project depends used to frame the search query that led to the search result.

As also detailed herein, generating a rank can include computing a score of pair-wise dependence between all pairs of concepts (that is, all concepts with records available in the repository) by analyzing their records in the knowledge repository. Computing a score of pair-wise dependence between concepts includes computing, for each concept, a text similarity score for all pairs of records for each concept in the repository. A pair of records is determined to be similar if the text similarity score for a pair of records is greater than a chosen threshold. Additionally computing a score of pair-wise dependence between concepts can include computing, for all pairs of concepts ($C_i$, $C_j$), a probability that two records of $C_j$ are similar given that linked records of a related concept $C_i$ are known to be similar. The probability can serve as the score for dependence of $C_j$ on $C_i$.

The techniques depicted in FIG. 7 can also, as described herein, include providing a system, wherein the system includes distinct software modules, each of the distinct software modules being embodied on a tangible computer-readable recordable storage medium. All the modules (or any subset thereof) can be on the same medium, or each can be on a different medium, for example. The modules can include any or all of the components shown in the figures. In an aspect of the invention, the modules include a Rel computation module, a query creator module, a target fetching module and a rank aggregation module that can run, for example on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 7 can be implemented via a computer program product that can include computer useable program code that is stored in a computer readable storage medium in a data processing system, and wherein the computer useable program code was downloaded over a network from a remote data processing system. Also, in an aspect of the invention, the computer program product can include computer useable program code that is stored in a computer readable storage medium in a server data processing system, and wherein the computer useable program code are downloaded over a network to a remote data processing system for use in a computer readable storage medium with the remote system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in a computer readable medium having computer readable program code embodied thereon.

An aspect of the invention or elements thereof can be implemented in the form of an apparatus including a memory and at least one processor that is coupled to the memory and operative to perform exemplary method steps.

Figure 8:
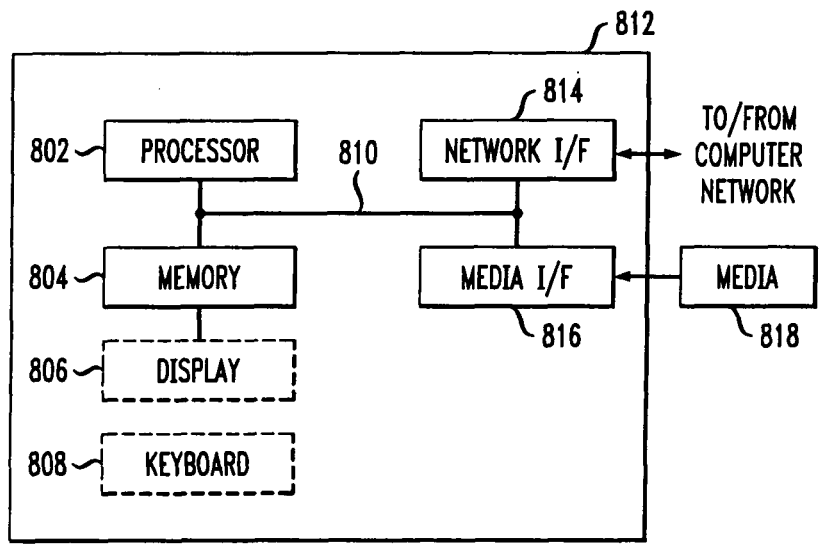
FIG. 8 is a system diagram of an exemplary computer system on which at least one embodiment of the invention can be implemented.

Additionally, an aspect of the present invention can make use of software running on a general purpose computer or workstation. With reference to FIG. 8, such an implementation might employ, for example, a processor 802, a memory 804, and an input/output interface formed, for example, by a display 806 and a keyboard 808. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 802, memory 804, and input/output interface such as display 806 and keyboard 808 can be interconnected, for example, via bus 810 as part of a data processing unit 812. Suitable interconnections, for example via bus 810, can also be provided to a network interface 814, such as a network card, which can be provided to interface with a computer network, and to a media interface 816, such as a diskette or CD-ROM drive, which can be provided to interface with media 818.

Accordingly, computer software including instructions or code for performing the methodologies of the invention, as described herein, may be stored in an associated memory devices (for example, ROM, fixed or removable memory)

and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 802 coupled directly or indirectly to memory elements 804 through a system bus 810. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 808, displays 806, pointing devices, and the like) can be coupled to the system either directly (such as via bus 810) or through intervening I/O controllers (omitted for clarity).

Network adapters such as network interface 814 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 812 as shown in FIG. 8) running a server program. It will be understood that such a physical server may or may not include a display and keyboard.

As noted, aspects of the present invention may take the form of a computer program product embodied in a computer readable medium having computer readable program code embodied thereon. Also, any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using an appropriate medium, including but not limited to wireless, wireline, optical fiber cable, RF, etc., or any suitable combination of the foregoing.

Computer program code for carrying out operations for aspects of the present invention may be written in any combination of at least one programming language, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. Accordingly, an aspect of the invention includes an article of manufacture tangibly embodying computer readable instructions which, when implemented, cause a computer to carry out a plurality of method steps as described herein.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, component, segment, or portion of code, which comprises at least one executable instruction for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the components shown in FIG. 4. The method steps can then be carried out using the distinct software modules and/or sub-modules of the system, as described above, executing on a hardware processor 802. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof; for example, application specific integrated circuit(s) (ASICS), functional circuitry, an appropriately programmed general purpose digital computer with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of another feature, integer, step, operation, element, component, and/or group thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

At least one aspect of the present invention may provide a beneficial effect such as, for example, ranking search results by weighting the textual relevance of the content by the strength of the relationship between the semantics of the query that was run and the content that will be authored.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for semantic and contextual searching over a knowledge repository to provide a record for a target concept based on a search context set by records of at least one related concept previously authored in a project, wherein the method comprises:

creating a search query for each of at least one concept related to the target concept to form a search context, wherein the search query for each of the at least one related concept comprises at least one word derived from at least one record of that concept previously authored in the project;

running the search query on a search index of a knowledge repository to identify at least one record of the at least one related concept for which the search query is created;

fetching the at least one record of the target concept from the repository as a search result such that the at least one fetched record of the target concept is linked in the knowledge repository to a record of the at least one related concept returned as a result of running the search query on at least one record of the at least one related concept; and generating a rank for each fetched record of the target concept, wherein the rank is a recursive weighted mean of a product of a relevance rank returned from the search query on the search index for the at least one record of the related concept and a relevance score between the target concept and the at least one related concept;

wherein the recursive weighted mean is computed by:
  adding the product of the relevance rank and the relevance score to a first variable to obtain a first sum;
  adding the relevance score to a second variable to obtain a second sum;
  dividing the first sum by the second sum to obtain the rank for a given fetched record;
  designating the first sum as the first variable;
  designating the second sum as the second variable; and
  based on previously executed designating steps, repeating the adding steps, the dividing step, and the designating steps for each subsequent fetched record until each fetched record has been ranked;

wherein the relevance score between all pairs of concepts is computed by computing:
  for each concept, a textual similarity between all pairs of records of that concept wherein when the textual similarity exceeds a threshold, the pair of records are considered related; and
  for all pairs of concepts, a probability of a first pair of records of a first concept being related to each other, given that a second pair of records of a second concept is related, and respectively linked to the first pair of records of the first concept;

wherein the steps are carried out by at least one computer device;

wherein the knowledge repository comprises records from at least one past project;

wherein the records from the at least one past project are defined in an information schema; and wherein two or more records produced in the at least one past project are deemed linked if their respective concepts are related in the information schema.

2. The method of claim 1, wherein the rank makes use of a pre-computed relevance score between concepts in an information schema in the knowledge repository.

3. The method of claim 1, wherein generating a rank for each fetched record comprises computing a rank for each fetched record as a function of a score that indicates textual relevance of each record in the search query that led to the search result.

4. The method of claim 1, wherein generating a rank for each fetched record comprises computing a rank for each fetched record as a function of a score that gives a degree of dependence of a target concept upon the each of at least one concept on which a project depends used to frame the search query that led to the search result.

5. The method of claim 1, wherein running the search query on a search index of a knowledge repository to identify at least one record related to the at least one concept on which the project depends from the repository comprises analyzing information created in the project leading up to a current activity and utilizing the information to identify content from the repository.

6. The method of claim 1, wherein creating a search query for each of at least one concept on which a project depends to form a search context comprises creating a set of at least one query from text of every record created in the project that impacts a current activity of the project.

7. The method of claim 1, wherein fetching the at least one record from the repository as a search result for the project comprises fetching a record of a target concept that is linked to the at least one identified record for a related concept in the repository which is similar to the record of the related concept previously authored in the project.

8. The method of claim 1, wherein fetching the at least one record from the repository as a search result for the project comprises transitively following links starting from identified records of the related concept in the repository, which are similar to the at least one record of the related concept previously authored in the project, to fetch at least one record of a target concept.

9. A method for semantic and contextual searching over a knowledge repository to provide a record for a target concept based on a search context set by records of at least one related concept previously authored in a project, wherein the method comprises:
   creating a search query for each of at least one concept related to the target concept to form a search context, wherein the search query for each of the at least one related concept comprises at least one word derived from at least one record of that concept previously authored in the project;
   running the search query on a search index of a knowledge repository to identify at least one record of the at least one related concept for which the search query is created;
   fetching the at least one record of the target concept from the repository as a search result such that the at least one fetched record of the target concept is linked in the knowledge repository to a record of the at least one related concept returned as a result of running the search query on at least one record of the at least one related concept; and
   generating a rank for each fetched record of the target concept, wherein the rank is a recursive weighted mean of a product of a relevance rank returned from the search query on the search index for the at least one record of the related concept and a relevance score between the target concept and the at least one related concept;
   wherein the recursive weighted mean is computed by:
      adding the product of the relevance rank and the relevance score to a first variable to obtain a first sum;
      adding the relevance score to a second variable to obtain a second sum;
      dividing the first sum by the second sum to obtain the rank for a given fetched record;
      designating the first sum as the first variable;
      designating the second sum as the second variable; and
      based on previously executed designating steps, repeating the adding steps, the dividing step, and the designating steps for each subsequent fetched record until each fetched record has been ranked;
   wherein the relevance score between all pairs of concepts is computed by computing:
      for each concept, a textual similarity between all pairs of records of that concept wherein when the textual similarity exceeds a threshold, the pair of records are considered related; and
      for all pairs of concepts, a probability of a first pair of records of a first concept being related to each other, given that a second pair of records of a second concept is related, and respectively linked to the first pair of records of the first concept.

10. The method of claim 9, wherein the rank makes use of a pre-computed relevance score between concepts in an information schema in the knowledge repository.

11. The method of claim 9, wherein generating a rank for each fetched record comprises computing a rank for each fetched record as a function of a score that indicates textual relevance of each record in the search query that led to the search result.

12. The method of claim 9, wherein generating a rank for each fetched record comprises computing a rank for each fetched record as a function of a score that gives a degree of dependence of a target concept upon the each of at least one concept on which a project depends used to frame the search query that led to the search result.

13. The method of claim 9, wherein running the search query on a search index of a knowledge repository to identify at least one record related to the at least one concept on which the project depends from the repository comprises analyzing information created in the project leading up to a current activity and utilizing the information to identify content from the repository.

14. The method of claim 9, wherein creating a search query for each of at least one concept on which a project depends to form a search context comprises creating a set of at least one query from text of every record created in the project that impacts a current activity of the project.

15. The method of claim 9, wherein fetching the at least one record from the repository as a search result for the project comprises fetching a record of a target concept that is linked to the at least one identified record for a related concept in the repository which is similar to the record of the related concept previously authored in the project.

16. The method of claim 9, wherein fetching the at least one record from the repository as a search result for the project comprises transitively following links starting from identified records of the related concept in the repository, which are similar to the at least one record of the related concept previously authored in the project, to fetch at least one record of a target concept.

* * * * *